INVENTOR.
Arthur Girsberger
BY
Michael J. Striker
Atty

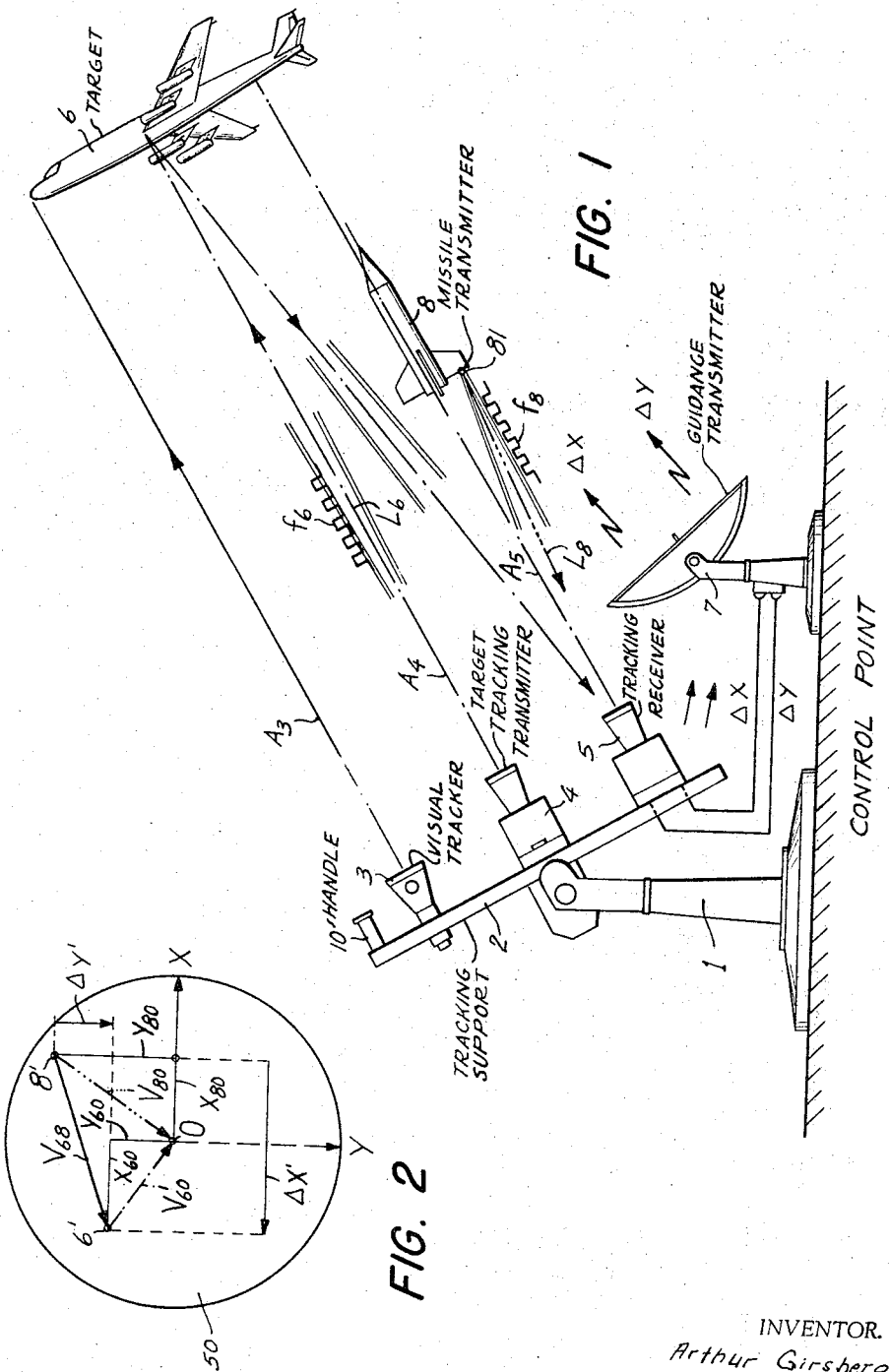

United States Patent Office 3,338,534
Patented Aug. 29, 1967

3,338,534
COMMAND GUIDANCE FOR GUIDED MISSILES
Arthur Girsberger, Opfikon, Zurich, Switzerland, assignor to Contraves AG, Zurich, Switzerland
Filed Dec. 23, 1963, Ser. No. 332,663
Claims priority, application Switzerland, Dec. 21, 1962, 15,067/62
5 Claims. (Cl. 244—3.14)

The present invention concerns the command guidance of guided missiles toward a target, particularly toward a moving target, the guidance being carried out at a given control point with the purpose of causing the missile to travel along a line of sight connecting the control point with the target.

Command guidance systems of this general type are known in which direction finder means are used for determining separately the space coordinates of the target in a chosen stationary coordinate system and other direction finder means are used for determining the space coordinates of the missile in another stationary coordinate system. By comparing the space coordinates of the target with the space coordinates of the missile and by subsequent computation data are obtained which can be used for applying corresponding command guidance signals to the missile for the purpose of guiding it into the desired trajectory coinciding as far as possible with the line of sight to the target. However, it has been found that this system cannot work with sufficient accuracy and reliability unless the coordinate system used by one of the direction finder means is identical and remains identical with the other coordinate system used by the other direction finder means, a condition which hardly exists or can hardly be established under practical conditions.

In more recently developed command guidance systems for guiding guided missiles toward a freely moving target along the line of sight toward this target by means of an infra-red tracking device stationed at the control point and permanently oriented approximately toward the target the task exists to direct or to orient the operative or sighting axis of the tracking device continuously as accurately as possible toward the target. In this system guidance command signals are produced in the tracking device and transmitted to the guided missile in such a manner that these guidance command signals correspond at any given moment to the vector from the center of the picture plane to the picture point representing the location of the guided missile at such given moment in the picture plane in order to guide the guided missile into a path coinciding with the operative axis of the tracking device. However, it has been found that a satisfactory accuracy of fire i.e. a hit on the target can be achieved only under the not realizable condition that the operative or sighting axis of the tracking device is in fact continuously and faultlessly directed at the target and that the guided missile travels exactly along the extension of the operative or sighting axis of the tracking device without being influenced by outer forces like gravity and wind.

All the known command guidance systems tending to guide the guided missile along the line of sight to the target display the disadvantageous characteristic of all open control loops, namely they do not comprise any means for determining the magnitude and direction of that deviation of the trajectory from the desired path of the missile the knowledge of which is imperatively necessary for achieving a satisfactory accuracy of fire.

It is therefore one object of this invention to provide for a method and arrangement in a command guidance system capable of determining at any given moment the actual positional error of the missile or its trajectory relative to the line of sight to the target at such given moment, and to transmit to the guided missile guidance control signals in a manner tending to reduce such an existing error toward zero.

It is another object of this invention to provide for a method and arrangement of the type set forth in which the guided missile is controllable by at least two types of guidance command signals effecting a change of the missile trajectory defined by components of such change which are located in selected coordinate planes intersecting in the axis of the missile and are effected by said two types of guidance command signals, such guidance command signals being derived directly from the determination of an existing positional error of the missile.

It is still another object of this invention to provide for a method and arrangement of the type set forth which is comparatively simple and entirely reliable in operation.

With the above objects in view the invention includes a command guidance method for guiding a guided missile toward a target, particularly, a moving target, said guided missile being controllable by at least two types of guidance command signals effecting a change of the missile trajectory, and such changes being defined by components thereof which are located in selected coordinate planes intersecting in the axis of the missile and are effected by said two types of guidance command signals, respectively, comprising the steps of: tracking at a control point both the target and the missile simultaneously; forming on a reference surface distinct point indications of the positions of the target and of the missile, respectively, at any given moment, said point indications having on said reference surface a position relative to each other corresponding to the positional relation between the points of intersection of the lines of sight from said control point to said target and to said missile, respectively, at said given moment with a plane transverse of said line of sight to said target so that a deviation of the path of said guided missile from said line of sight to the target at said given moment is represented by an imaginary line connecting said point indications with each other; deriving from said indications on said reference surface electric signals proportionate to two components, respectively, of said imaginary line, said components being oriented respectively parallel with said selected coordinate planes; and transmitting guidance command signals proportionate to said electric signals, respectively, to said guided missile in a manner tending to reduce said deviation toward zero.

In another aspect the invention also includes a command guidance arrangement for guiding a guided missile toward a target, particularly a moving target, said guided missile being controllable by at least two types of guidance command signals effecting a change of the missile trajectory, such change being defined by components thereof which are located in selected coordinate planes intersecting in the axis of the missile and are effected by said two types of guidance command signals, respectively, comprising in combination, tracking means located at a given control point and being controllable for being oriented with its operative axis at least approximately in the direction of a line of sight to the target and for simultaneously tracking the target and the missile, and including a reference surface and means for producing thereon a first point indication of the position of said target at any given moment and a second point indication of the position of said missile, at said given moment, said point indications having on said reference surface a position relative to each other corresponding to the positional relation between the points of intersection of the lines of sight from said control point to said target and to said missile, respectively, at said given moment with a plane transverse of said line of sight to said target so that a deviation of the path of said missile from said line of sight to said target at said given moment is represented by an imaginary line connecting said point indications with each other; electric means for deriving from said point indications on said reference surface electric signals proportionate to two components, respectively, of said imaginary line, said components being oriented respectively parallel with said selected coordinate planes; and guidance transmitter means cooperating with said electric means for transmitting guidance command signals proportionate to said electric signals, respectively, to said guided missile in a manner tending to reduce said deviation toward zero.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic overall diagram illustrating the system and method according to the invention;

FIG. 2 is an explanatory diagram representing conditions appearing in the field of view of the infra-red tracking device shown in FIG. 1;

FIG. 1 shows diagrammatically the tracking and evaluating devices stationed at the command point and a target as well as a missile on its way toward the target.

Figure 3:
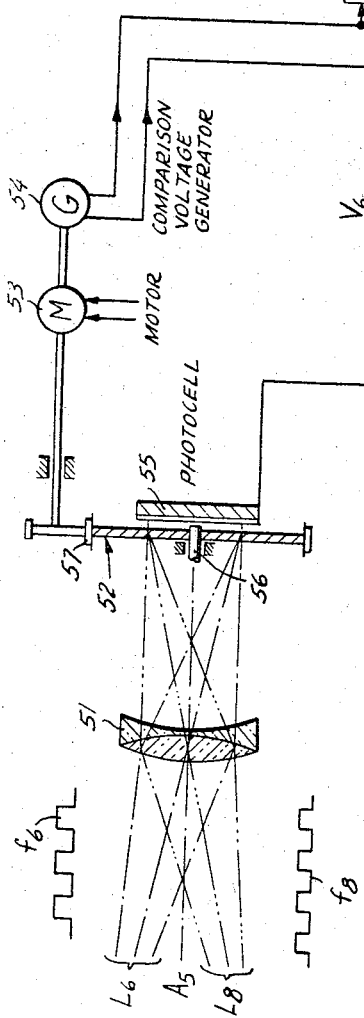
FIG. 3 is a diagrammatic illustration of certain details of the infra-red tracking device forming part of the arrangement according to FIG. 1.

In this example the arrangement at the command point comprises a base 1 carrying a support plate 2 which is tiltable about a horizontal axis and turnable about a vertical axis relative to the base 1. The support plate 2 carries a sighting telescope 3, an infra-red beam transmitter 4 and an infra-red tracking device 5 so oriented that the operative or optical axes $A_3$, $A_4$ and $A_5$ are substantially parallel with each other. A handle 10 may serve for tilting and swinging the support plate 2 in such a manner that an observer looking through the telescope 3 continuously sees in its field of view the target 6 e.g. an airplane or an armored car. The beam transmitter 4 which is actually also a tracking device for tracking the target is constructed for transmitting a beam $L_6$ of infra-red radiation which is pulse modulated at a selected frequency $f_6$ and directed toward the target so as to cause the latter to reflect such radiation back toward the control point. For instance, the beam transmitter 4 may comprise a laser which is pulse controlled at the frequency $f_6$.

A command guidance transmitter 7 also located at the command point is designed to transmit to a rocket or other guided missile 8 intended to be guided along a line of sight to the target by two types of guidance command signals $\Delta x$ (left or right) and $\Delta y$ (higher or lower) for changing thereby the missile trajectory. Of course, it is assumed that the missile 8 is so constructed that such a change of the direction of the missile trajectory can be defined by components thereof which are located in selected coordinate planes intersecting in the axis of the missile, preferably in a vertical plane through the axis and in a second plane perpendicular to the first plane and also passing through the axis of the missile. Each of the componental direction changes can be brought about by a different one of the two types of guidance command signals mentioned above. By transmitting to the missile 8 the guidance command signals $\Delta x$ and $\Delta y$ the trajectory will be continuously so corrected that the rocket travels always along a line which connects at the given moment the rocket with the target. The rocket 8 may also be irradiated by the beam transmitter 4 so that the reflection of this irradiation would return to the control point. In the illustrated example it is assumed that the rocket 8 is equipped with an infra-red transmitter 81 which emits an infra-red beam $L_8$ pulse modulated at a second frequency $f_8$ in direction toward the control point.

The infra-red tracking and guidance command device 5 receives within its field of view under all circumstances the reflected infra-red radiation returning from the target 6 pulsing at a frequency $f_6$ and normally also the infra-red radiation coming from the missile 8 pulsing at a different frequency $f_8$. On a reference surface 50 in the device 5 distinct point indications of the positions of the target 6 and of the missile 8, respectively, at any given moment are produced by the received radiation. In FIG. 2 the point 6' is the point indication of the position of the target 6 while the point 8' is the point indication of the position at the same moment of the missile 8. The point indications 6' and 8' on the reference surface 50 have a position relative to each other which corresponds to the positional relation between the points of intersection of the lines of sight from the control point to the target 6 and to the missile 8, respectively, at a given moment with a plane transverse of said line of sight to the target 6 so that the existing deviation of the path of the missile 8 from the line of sight to the target 6 at said given moment is represented by an imaginary line $V_{68}$ connecting the point indications 6' and 8' with each other. For explanatory purposes this line $V_{68}$ may be called the error vector. Since the guidance command signals to be transmitted to the missile 8 must correspond, in view of the construction and control devices of the missile 8, to components of a desired change located in selected coordinate planes as mentioned above, it is necessary to resolve the above mentioned error vector $V_{68}$ into two vectorial components $\Delta x'$ and $\Delta y'$ located respectively in directions parallel with the above mentioned coordinate planes characteristic of the missile control and represented in FIG. 2 by the coordinates X and Y.

As will be described in greater detail further below the tracking device 5 is further equipped with electrical means for deriving from the location of the point indication 6' and 8' on the reference surface 50 electric signals which are proportionate to the magnitude respectively of the error coordinates $\Delta x'$ and $\Delta y'$ whereafter the command guidance transmitter cooperating with the tracking device 5 will transmit to the guided missile 8 guidance command signals $\Delta x$ and $\Delta y$ proportionate to said electric signals furnished by the tracking device 5.

Referring more specifically to FIG. 2, it will be understood that the center O of the coordinate system X, Y is also the center of the field of view of the tracking device 5 and as such the center point O is the projection of the optical axis $A_5$ on the reference surface 50. Analogously, the imaginary line $V_{60}$ connecting the center O with the point indication 6' is the projection of the line of sight to the target 6 onto the reference surface 50, and similarly the imaginary line $V_{80}$ connecting the center point O with the point indication 8' of the position of the missile 8 is the projection of the line of sight to the missile 8 onto the reference surface 50. For the purpose of explanation it is convenient to consider also the lines $V_{60}$ and $V_{80}$ as vectors in the coordinate system X, Y. Under these circumstances it is proper to state that the error vector $V_{68}$ is the vectorial difference between the vectors $V_{60}$ and $V_{80}$.

It is further suitable to consider that each of the vectors $V_{60}$ and $V_{80}$ can be resolved into corresponding components $X_{60}$, $Y_{60}$ as well as $X_{80}$ and $Y_{80}$, respectively, parallel with the corresponding axes X and Y. Consequently the vectorial error vector components $\Delta x'$ and $\Delta y'$ constitute the vectorial differences $X_{60}-X_{80}$ and $Y_{60}-Y_{80}$, respectively. It will be shown further below that all these components and componental differences are converted into proportional electric signals. Since finally guidance command signals proportionate to the error vector components $\Delta x'$ and $\Delta y'$ are transmitted to the guided missile, it is clear that the latter is controlled in a manner tending to reduce the error vector $V_{68}$ toward zero which means nothing else but that the rocket or missile 8 is so guided that its trajectory coincides with the desired line of sight to the target 6.

As illustrated by FIG. 3, the tracking device 5 comprises an optical system 51 capable of handling infra-red radiation and having an optical axis $A_5$. Substantially in the focal plane of this optical system a rotary optical shield 52 is arranged and supported at 56 for rotation about the optical axis $A_5$. The rotary shield 52 is driven e.g. by frictional engagement at its periphery 57, by means of an electro-motor 53 which is also coupled with a generator 54 at constant speed e.g. at 6000 r.p.m.

Figure 5:
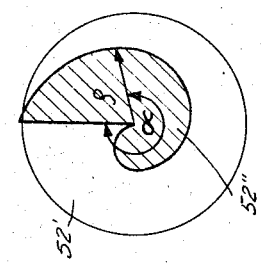
FIGS. 4 and 5 illustrate in plan view two modifications of a rotary shield forming part of the arrangement according to FIG. 3.
Figure 4:
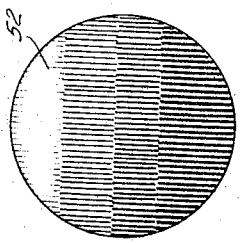

The rotary shield 52 according to FIG. 4 is constructed in a well known manner as a circular segment cut from a neutral gray wedge, but it may as well be constructed as a shield 52' illustrated by FIG. 5 which in a likewise well known manner is composed of a transparent portion and of a non-transparent portion 52" which is defined by a spiral the radius $\rho$ of which increases continuously and uniformly as a function of the angle $\alpha$ from 0 up to a maximum within the angular range from 0 to 360°. It will be seen that the attenuating influence exerted by the rotating shield 52 or 52' on radiation impinging upon a specific point like 6' or 8' in FIG. 2 will serve to furnish a precise indication of the location of these points within the coordinate system X, Y. In accordance with the radial distance of the point where the radiation impinges, darker or lighter portions of shield 52 located along the respective circular area of the shield, will attenuate the signals so the amount of light passing through the shield is proportionate to the radial distance of the respective point.

Directly behind the rotary shield 52 a photocell 55 of conventional type and suitable magnitude is so arranged that radiation passing through the optical system 51 and through the rotary shield 52 will generate a corresponding photocurrent in said photocell 55. The amplitude of the photocurrent depends on the attenuation of the signal by the respective circular area scanned by the signal during rotation of shield 52, and consequently on the radial distance of the point of impingement from the center. In the illustrated example the infra-red radiation caused by the infra-red beam $L_6$ returned from the target 6 with a pulse modulation at the frequency $f_6$ and the radiation coming from the missile 8 as a beam $L_8$ with a pulse modulation at the frequency $f_8$ will under these circumstances produce in the photocell 55 two photocurrents $J_{56}$ and $J_{58}$, respectively, with a carrier frequency $f_6$ and $f_8$, respectively. The photocurrent $J_{56}$ is permitted to pass through a band pass filter $BF_6$ tuned to the frequency $f_6$ and an amplifier $V_6$ to a demodulator $D_6$ which eliminates the high carrier frequency oscillation on which the low frequency oscillation $f_6$ was superimposed whereby a low frequency alternating current is produced the amplitude of which is always proportionate to the radial distance of the point indication 6' from the center O i.e. to the length of the vector $V_{60}$, while the phase angle of this current $J_{56}$ relative to a constant alternating voltage produced by the generator 54 corresponds to the angular direction of the vector $V_{60}$ relative to a predetermined reference line e.g. to the X-axis in the reference surface 50 according to FIG. 2.

In a quite analogous manner the other photocurrent $J_{58}$ which is prevented from passing into the amplifier $V_6$ is instead passed by the second band pass filter $BF_8$ into the amplifier $V_8$ and is then applied to the demodulator $D_8$ where it is converted into a low frequency alternating current the amplitude of which corresponds to the radial distance of the point indication 8' from the center point O i.e. to the length of the vector $V_{80}$, while its phase angle relative to the alternating voltage produced by the generator 54 corresponds to the angular direction of the vector $V_{80}$ relative to the above mentioned reference direction namely the X-axis in the reference surface 50 of FIG. 2.

In view of the above it is possible to arrange as shown in FIG. 3 two pairs of phase discriminator devices $PD6x$, $PD6y$ and $PD8x$, $PD8y$ of conventional type and in a conventional manner so that they are all controlled by the same reference alternating voltage furnished by the generator 54 and produce because of being connected in pairs with the demodulator $D_6$ and the demodulator $D_8$, respectively, pairs of electric signals $x_{60}$, $y_{60}$ and $x_{80}$, $y_{80}$, respectively, which signals are proportionate to the components of the vectors $V_{60}$ and $V_{80}$, respectively, namely to the vectorial components $X_{60}$, $Y_{60}$ and $X_{80}$, $Y_{80}$. Signals $y_{60}$ and $y_{80}$ represent ordinates, and signals $x_{60}$ and $x_{80}$ abcissas in a system of rectangular coordinates whose axes are provided by the voltage of generator 54. By means of a conventional difference former $S_x$ between the discriminator outputs furnishing the voltages $x_{60}$ and $x_{80}$ a final output signal $\Delta x$ is produced in a manner well known per se so as to represent the vectorial difference between the components $X_{60}$ and $X_{80}$ or, in other words the component $\Delta x'$ of the error vector $V_{68}$. In the same manner the difference former $S_y$ connected between the discriminator outputs furnishing signals proportionate to the components $Y_{60}$ and $Y_{80}$ furnishes a final output signal $\Delta y$ proportionate to the vectorial difference between the vectors $Y_{60}$ and $Y_{80}$ or in other words to the component $\Delta y'$ of the error vector $V_{68}$.

It will be noted that the use of the conventional neutral wedge shield 52 will produce in a well known manner an amplitude modulation of the carrier frequency photocurrent components. Instead a time modulation of these components may be produced with the aid of the rotary shield type 52' as illustrated by FIG. 5. In either case of course the demodulators $D_6$ and $D_8$ must be constructed in a well known manner so as to match the type of modulation produced by one or the other of the shields according to FIGS. 4 and 5.

As a matter of principle, any infra-red tracking device suitable for producing a pair of signals defining the location of a picture point relative to an optical reference axis can be used for the purpose of this invention by combining it with a second signal producing arrangement of the type described and with difference formers as mentioned above.

It will be understood that in accordance with the invention the guided missile always obtains guidance command signals which at any given moment correspond to the actual relative position of the point indication of the missile position with respect to the point indication of the target position in the reference surface or picture plane of the infra-red tracking device so that the guided missile is guided toward a coincidence of the two point indications i.e. toward a position or trajectory which actually coincides with the line of sight to the target. It has been found particularly convenient to combine certain conventional components with each other in such a manner that first signals are produced which are proportional to the components of the vectors from the reference surface center to the point indication of the target position and the point indication of the missile position, respectively, and to derive therefrom by means of conventional difference formers the actual guidance command signals to be transmitted to the guided missile.

Also it has been found highly convenient to arrange the beam transmitter and the actual infra-red tracking device together with a sighting telescope on one common turnable and tiltable support so that it is easy for the observer to keep the axes of these three combined devices oriented toward the target. Moreover it is also highly advantageous that for the purpose of separation from each other the signals coming in the form of infra-red radiation from the target are modulated e.g. by pulses at a different frequency than the similar signals coming as pulse modulated radiation from the missile.

Under these circumstances it is comparatively simple to separate e.g. by means of filters the signals characterized by one modulation frequency from the other signals characterized by a second modulation frequency and thus to obtain the desired output signals by separate difference formation within each of said signal groups. Since the direction of the coordinates or components into which the vectors appearing on the reference surface are resolved are intentionally parallel with the coordinate planes in which the coordinates of the desired trajectory changes are located, the output signals obtained as above can be used directly or at least in proportionate magnitude as the guidance command signals to be transmitted to the missile. In view of this and as is clear from the entire description above it is not necessary anymore to maintain the optical axis $A_3$ of the sighting telescope or the operative axis $A_5$ of the actual tracking device directly and accurately on a line directed to the target. To the contrary, all that is necessary is that during the operation the target remains somewhere within the field of view of the tracking device 5. Therefore, it is also permissible to replace a conventional automatic and therefore rather involved and expensive target following mechanism by a simple hand control of the orientation of the support platform 2 as shown above as being controllable by an observer through actuation of a handle 10.

Suppementary to the above it may be stated that in a successful embodiment of the invention a modulation frequency $f_6$ of $6 \times 10^4$ pulses per second and a modulation frequency $f_8$ of $4 \times 10^4$ pulses per second have been used. In the same embodiment the motor 53 and the generator 54 were operated at a rotary speed of 6000 r.p.m. and the alternating voltage furnished by the generator 54 had a frequency of 100 c.p.s.

It will be understood that each of the elements described above, or two or more together, may also find a useful application in other types of a command guidance method and arrangement for guiding a guided missile toward a target differing from the types described above.

While the invention has been illustrated and described as embodied in a command guidance method and arrangement for guiding a guided missile toward a target by means of control signals derived directly from an indication of the relative position of the missile with respect to a target at a given moment, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A command guidance arrangement for guiding a missile toward a target, comprising, in combination, tracking means located at a control point and including means for emitting a first electromagnetic radiation, a reference surface having a center which represents the projection of a line of sight from said control point to a tracked target, and means for producing on said reference surface a first point indication of said radiation reflected by said target and representing the target position; a tiltable support for said tracking means operable so that said tracking means follows said target; means on said missile for emitting a second electromagnetic radiation at a predetermined frequency received by said tracking means for producing a second point indication on said reference surface, said first and second point indications having on said reference surface a position relative to each other corresponding to the positional relation between the points of intersection of lines of sight from said control point to said target and said missile, respectively, with a plane transverse to the line of sight to said target; electric means for deriving from each of said point indications first and second electric signals proportional to two components of a system of coordinates having the origin thereof in said center; and guidance transmitter means controlled by said electric means for transmitting guidance command signals proportionate to said first and second electric signals, respectively, to said guided missile for reducing said components of said point indications to zero.

2. A command guidance arrangement for guiding a missile toward a target, comprising, in combination, tracking means located at a control point and including means for emitting infrared radiation at a first frequency, a reference surface having a center which represents the projection of a line of sight from said control point to a tracked target, and means for producing on said reference surface a first point indication of said radiation reflected by said target and representing the target position; a tiltable support for said tracking means operable so that said tracking means follows said target; means on said missile for emitting infrared radiation at a second frequency received by said tracking means for producing a second point indication on said reference surface, said first and second point indications having on said reference surface a position relative to each other corresponding to the positional relation between the points of intersection of lines of sight from said control point to said target and said missile, respectively, with a plane transverse to the line of sight to said target; electric means including band filter means for distinguishing between said first and second frequencies for deriving from each of said point indications first and second electric signals proportional to two components of a system of coordinates having the origin thereof in said center; and guidance transmitter means controlled by said electric means for transmitting guidance command signals proportionate to said first and second electric signals, respectively, to said guided missile for reducing said components of said point indications to zero.

3. A guidance arrangement according to claim 2 wherein said system of coordinates is a rectangular system; and wherein said electric means include first and second phase discriminators phase-shifted 90°.

4. A guidance arrangement according to claim 2 wherein said tracking means include an optical system whose axis coincides with said center of said reference surface; a rotary shield having portions of different transparency rotating about said axis so that rays from said first and second point indications are attenuated proportionate to the radial distance thereof from said center and said axis; a photocell behind said shield for producing first and second signals whose amplitude represents said radial distances and which have said first and second frequencies, respectively, said band filters receiving said first and second signals for separating the same.

5. A guidance arrangement according to claim 4 wherein said electrical means further include first and second amplifiers for said first and second signals; first and second demodulators for the amplified signals; a generator rotating in synchronism with said shield and producing an alternating voltage having a comparison frequency; two pairs of phase discriminators receiving said alternating voltage and the demodulated first and second signals, and having a phase difference of 90°; and two difference forming devices connected with said phase discriminators for forming two command signals corresponding to rectangular coordinates and supplied to said guidance transmitter means for controlling the same.

(References on following page)

References Cited

UNITED STATES PATENTS

| | | | |
|---|---|---|---|
| 2,745,095 | 5/1956 | Stoddard | 244—14 X |
| 2,930,894 | 3/1960 | Bozeman | 244—14 X |
| 2,942,118 | 6/1960 | Gedance. | |
| 2,944,763 | 7/1960 | Grandgent et al. | 244—14 |
| 3,169,727 | 2/1965 | Schroader et al. | 244—14 |
| 3,233,847 | 2/1966 | Girsberger | 244—14 |

RODNEY D. BENNETT, *Primary Examiner.*

BENJAMIN A. BORCHELT, *Examiner.*

M. F. HUBLER, *Assistant Examiner.*